June 7, 1960 W. B. WESTCOTT, JR 2,939,657
AIRCRAFT LANDING MECHANISM
Filed Feb. 25, 1957 3 Sheets-Sheet 1

INVENTOR.
WILLIAM B. WESTCOTT, JR
BY
ATTORNEY

June 7, 1960　　　W. B. WESTCOTT, JR　　　2,939,657
AIRCRAFT LANDING MECHANISM

Filed Feb. 25, 1957　　　　　　　　3 Sheets-Sheet 2

INVENTOR.
WILLIAM B. WESTCOTT, JR.
BY
ATTORNEY

INVENTOR.
WILLIAM B. WESTCOTT, JR.
BY
ATTORNEY

United States Patent Office 2,939,657
Patented June 7, 1960

2,939,657
AIRCRAFT LANDING MECHANISM
William B. Westcott, Jr., Cleveland Heights, Ohio, assignor to Cleveland Pneumatic Industries, Inc., a corporation of Ohio
Filed Feb. 25, 1957, Ser. No. 642,145
6 Claims. (Cl. 244—115)

This invention relates generally to a method and apparatus for landing aircraft and more particularly to a method and apparatus for landing and launching VTO aircraft.

The increased power available in the modern aircraft engine has made it possible to manufacture VTO aircraft capable of hovering in one spot. When the VTO aircraft hovers, the thrust produced by the aircraft engine is equal to the weight of the aircraft so that the aircraft is supported completely by the aircraft engine and not by the air-foil of the wings. The landing is accomplished by raising the aircraft to the vertical position at which time the thrust of the engine is vertical and equal to the weight. This type of aircraft has come to be known as a VTO which means "vertical take-off" and differs from a helicopter or the like wherein the aircraft is provided with power driven wings which support the ship in hovering flight. This invention is directed toward a new and improved method and mechanism for landing and launching VTO aircraft.

It is an important object of this invention to provide a method for landing VTO aircraft which can be used on either ship-board installations or land installations.

It is another important object of this invention to provide a mechanism for landing and launching VTO aircraft wherein substantially all of the mechanism for handling the aircraft is non-airborne thereby reducing the airborne weight to a minimum.

It is still another important object of this invention to provide means for landing and launching an aircraft which does not carry its own landing gear.

It is still another important object of this invention to provide a VTO aircraft landing mechanism wherein the pilot has good visibility during the entire landing and launching operation.

It is still another important object of this invention to provide a VTO aircraft landing device wherein the aircraft enters the device with forward motion.

It is still another important object of this invention to provide a VTO aircraft with a landing mechanism wherein the aircraft is positioned on a ground handling dolly during the landing cycle.

It is still another important object of this invention to provide a VTO aircraft landing mechanism which can be adjusted to compensate for the approach angle of the aircraft during its landing operation.

Further objects and advantages will appear from the following description and drawings, wherein.

Figure 1:
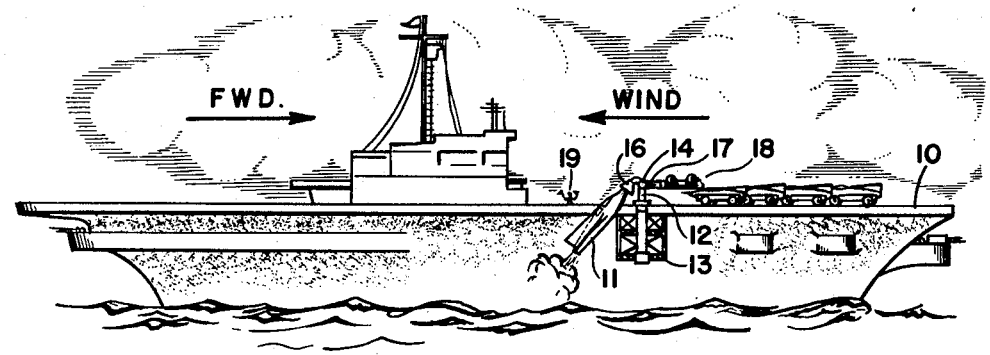
Figure 1 is a schematic illustration of a landing mechanism according to this invention as it would be used on ship-board installations.

In Figure 1 a landing and launching mechanism is shown as it would be mounted on a ship 10 the deck of which constitutes a landing platform. The actual landing and launching operation would take place when the aircraft 11 is hanging over the side of the ship 10. This is desirable since the heat of the jet from the aircraft is dissipated into the water. The landing and launching mechanism includes a support frame 12 journaled in a support 13 for rotation around a vertical axis and a laterally projecting boom 14. Journaled on the boom is a landing bell 16 adapted to receive the nose of the aircraft 11 and provided with means for automatically coupling with the aircraft nose during the landing cycle of operation. Also journaled on the boom 14 is a dolly support 17 to which a ground handling dolly 18 can be attached by removable pins 20.

During the landing and launching operation the ship 10 is normally moving into the wind as indicated by the arrow so that the wind is passing over the ship to the left as seen in Figure 1. Therefore, the aircraft 11 must have a horizontal velocity during the landing operation. Since the aircraft is supported by the thrust of the jet engine during the landing approach operations, this forward velocity is achieved by tipping the aircraft from the vertical position in the direction of horizontal movement so that the thrust from the jet engine will have a horizontal component as well as the vertical components which supports the aircraft. In normal landing, the aircraft approaches the ship from the stern and moves forward into position under the bell 16 which is rotated relative to the support frame 12 until its axis aligns with the approaching axis of the aircraft. During the landing the dolly support 17 and dolly 18 are in a horizontal forward position well out of the way of the aircraft. The aircraft 11 approaches along the side of the ship 10 so the pilot can easily see the ship during the landing approach. This makes it possible to use a signal officer 19 to assist the pilot in properly positioning the aircraft 11 in the landing bell 16.

Figure 2:
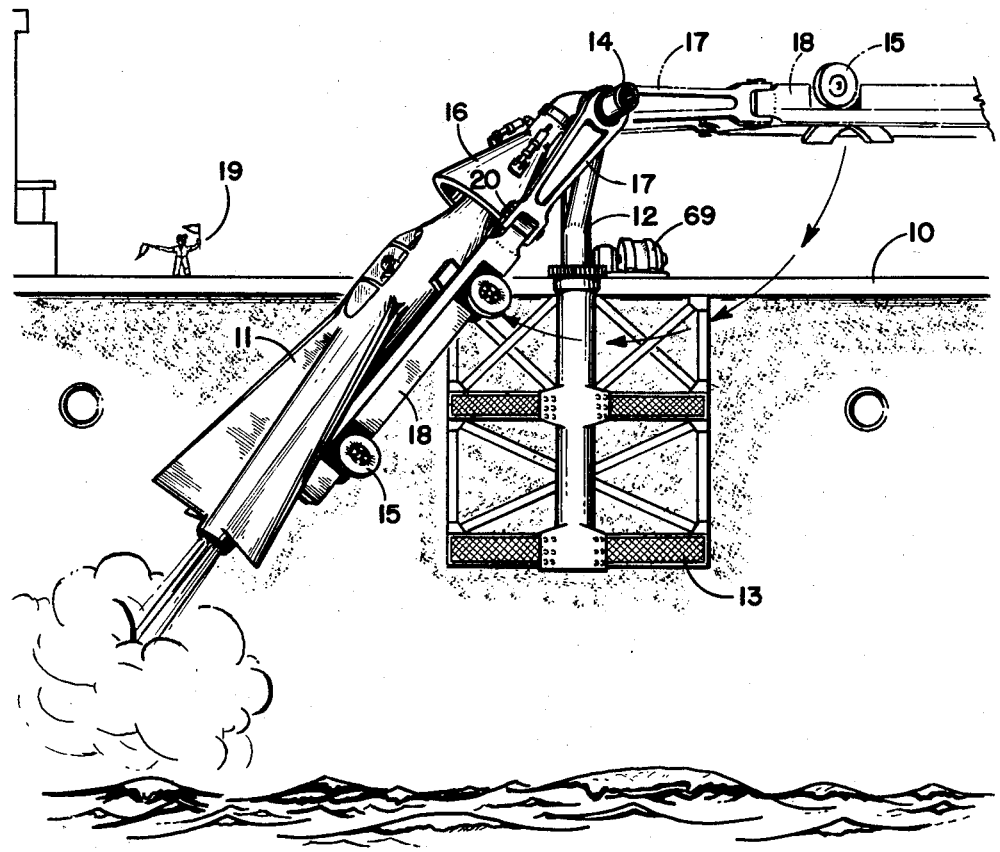
Figure 2 is an enlarged view of the mechanism showing how the ground handling dolly is moving into position under the aircraft after the aircraft is supported by the landing bell.

The pilot maneuvers the nose of the aircraft 11 into the landing bell 16 at which time an automatic coupling is made. The dolly support 17 and dolly 18 are then rotated around the boom 14 to bring the dolly into engagement with the under side of the aircraft 11 as shown in Figure 2. During this time the landing bell remains stationary and properly positions the aircraft 11 for engagement by the dolly 18. Once the dolly 18 is in engagement with the aircraft 11 and with the aircraft engine shut off, the landing bell 16 and the dolly 18 are rotated until the aircraft is in the horizontal or "A" position of Figure 3 level with the deck of the ship 10. The support frame 12 and boom 14 are then rotated around the vertical axis relative to the support 13 bringing the aircraft in over the deck of the ship as shown in the "B" position 3. At this time the dolly 18 is supported by its wheels 15 on the deck and in turn is supporting the aircraft 11. It is merely necessary to disconnect the dolly support 17 from the dolly 18 and the aircraft 11 from the landing bell 16 to complete the landing cycle.

Figure 3:
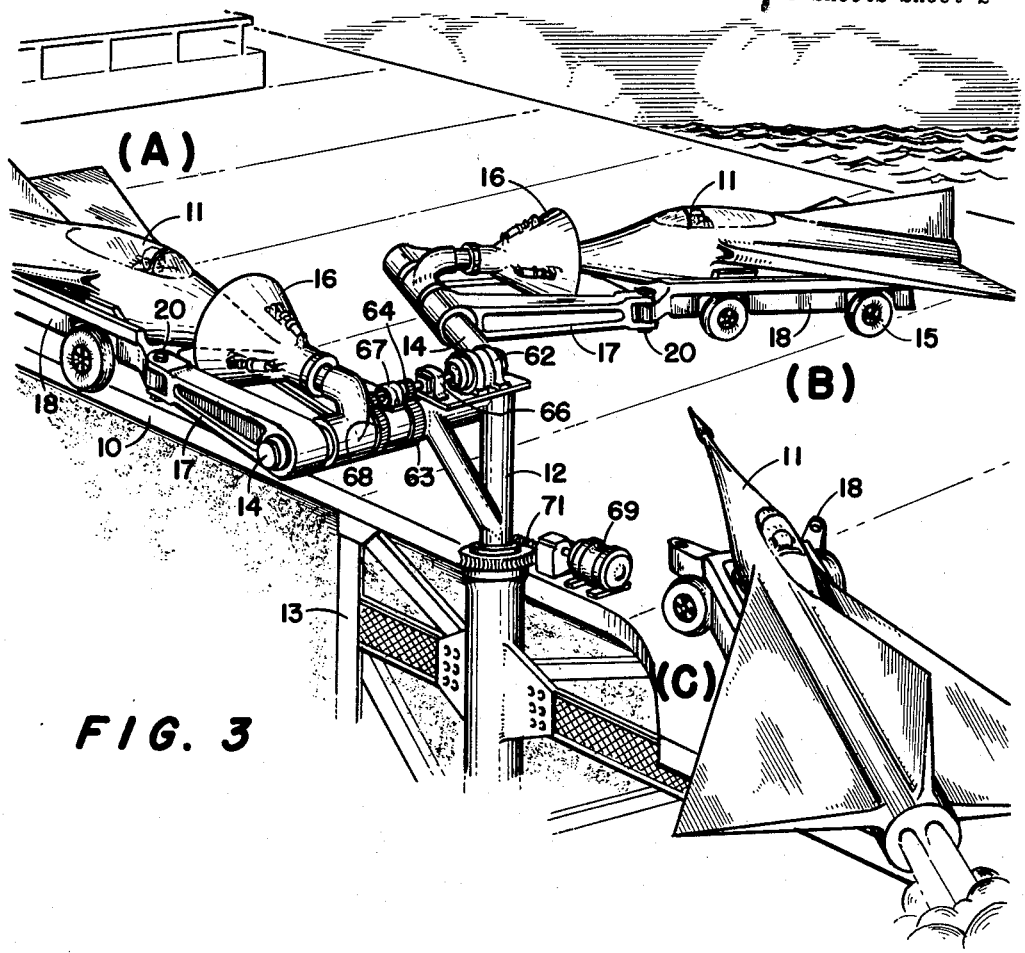
Figure 3 is a multi-position figure illustrating the method by which the aircraft is brought on-board the ship.

If a second aircraft is to be launched, it is positioned on its dolly in a position shown at "C" of Figure 3.

Figure 4:
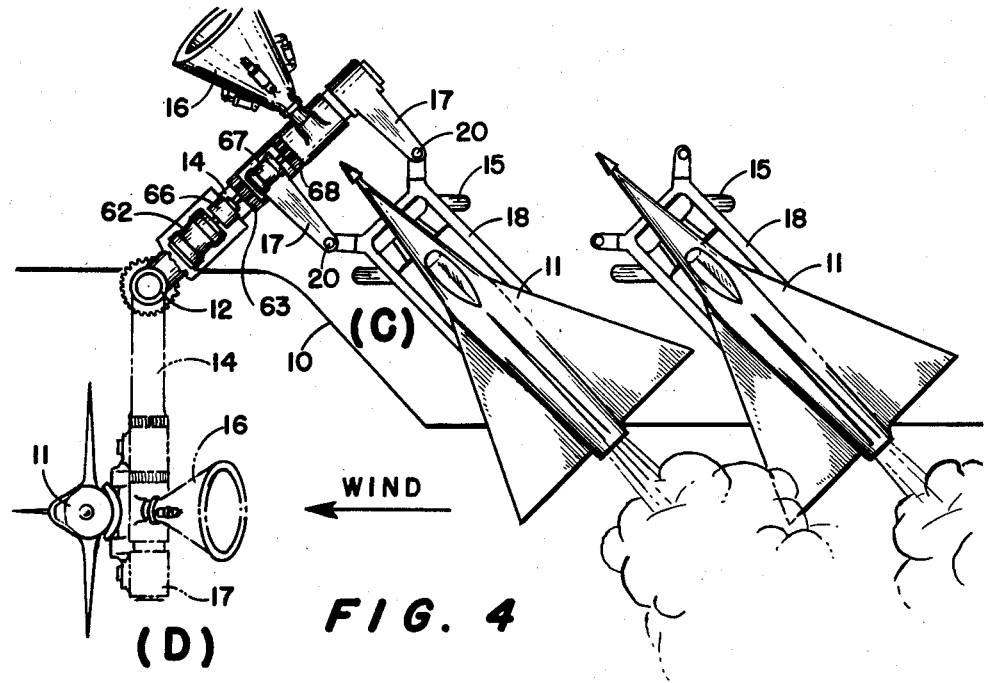
Figure 4 is a plan view illustrating steps of the take-off cycle.

The landing bell 16 is rotated relative to the boom 14 out of the way of the aircraft in the "C" position and the support frame 12 rotated around its axis until the dolly support 17 is in position to be coupled to the dolly 18 of the aircraft in the "C" or ready position. After the dolly 18 of the aircraft in the "C" position as shown in Figure 4 is connected to the dolly support 17, the support frame 12 is rotated to swing the aircraft over the side of the ship 10 and the dolly 18 and aircraft 11 are dropped to the vertical or take-off position "D" of Figure 4. It should be noted that the landing bell 16 is clear of the aircraft in the "C" and "D" positions so it is merely necessary for the pilot to increase the power of the aircraft engine until its thrust is greater than the weight of the aircraft at which time the aircraft will take-off vertically. Again the wind is passing over the bow of the ship and the angle of the aircraft should be arranged so that it will tend to move rearwardly of the ship during the take-off to clear the landing and launching mechanism. In most cases the take-off position of the aircraft will be essentially vertical so that the wind blows the aircraft away from the landing and launching mechanism during the initial movement of the take-off.

Figure 5:
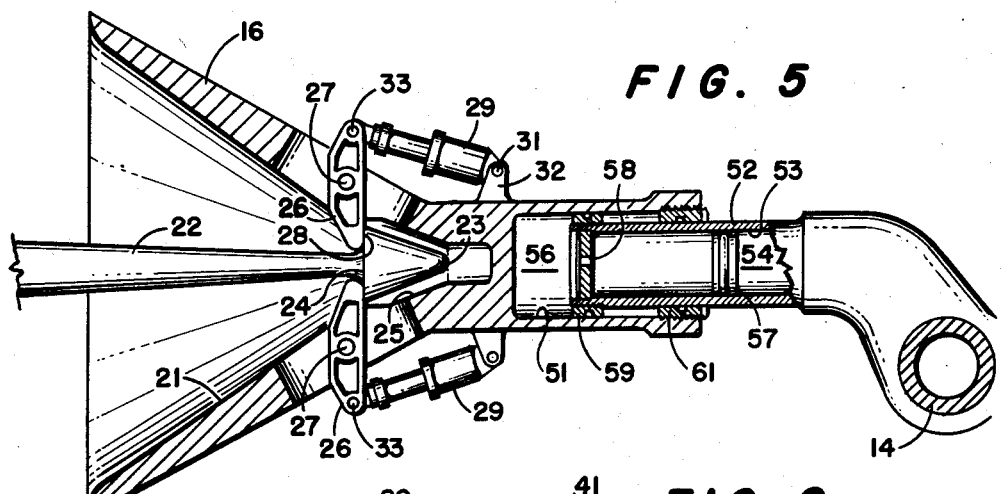
Figure 5 is an enlarged view, in longitudinal section, showing the structural detail of the landing bell and its mounting.

Reference should now be made to Figure 5 for the structural detail of the landing bell 16. The landing bell itself is formed as a hollow cone having a conical inner surface 21 adapted to receive a probe 22 mounted on the nose of the aircraft. If there is any misalignment between the probe 22 and the landing bell 16 during the landing operation, the forward end 23 of the probe will engage the inner conical wall 21 and be cammed into the vertex 25 of the landing bell 16. The forward end 23 of the probe 22 is formed with an arrowlike head which provides a rearwardly facing radial surface 24. Mounted symmetrically around the vertex 25 of the landing bell are a plurality of locking links 26, each mounted on the landing bell 16 by a pin pivot 27. These links 26 are provided with an inner end 28 adapted to engage the radial surface 24 on the probe 22 when coupling is made to prevent the probe from moving out of the landing bell. A locking device 29 pivotally mounted at 31 on a projection 32 formed on the landing bell 16 and also pivotally connected at 33 to the outer ends of each locking link 26 releasably locks the links 26 against rotation around the pivots 27 in a direction which would move the inner ends 28 to the left as seen in Figure 5 and also resiliently bias the linkage to the locked position. The link 26 can be rotated against the resilient bias in a direction which moves the inner ends to the right as seen in Figure 5 so that the inner end 23 of the probe 22 can pass the inner ends 28 during the landing.

Figure 6:
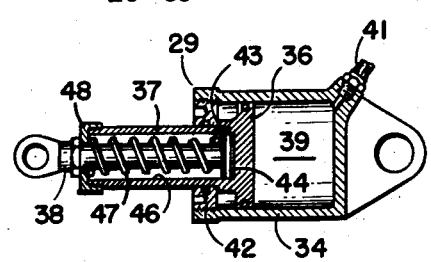
Figure 6 is an enlarged longitudinal section of the lock mechanism for the landing bell; and, Figure 7 is a schematic illustration of the mechanism used to secure the aircraft to the ground handling dolly during the take-off phase of the operation.

Referring to Figure 6 each of the locking devices 29 include a hollow cylinder 34 in which is positioned a piston head 36. A hollow piston rod 37 extends to the left from the piston head 36 and is adapted to receive a plunger rod 38. The piston head 36 and cylinder 34 co-operate to define a liquid chamber 39 which can be supplied with liquid under pressure through a pressure line 41 from a suitable source of pressure liquid. When liquid under pressure is present in the chamber 39, the piston head 36 is urged to the left relative to the cylinder 34 and is hydraulically locked against movement from the extended position. A gland nut 42 mounted in the cylinder 34 engages a shoulder 43 on the piston head when it is in the extended position shown to prevent further movement to the left.

The plunger rod 38 is formed with a head 44 which is normally seated against the inner end of the bore 46 of the hollow piston rod 37 by a spring 47. The spring 47 extends between the head 44 and a nut 48 threaded on the outer end of the hollow piston rod 37. Any force tending to move the plunger rod 38 to the left merely compresses the spring 47 and if the force is large enough moves the piston rod against the action of the spring. Conversely any force tending to move the plunger rod 38 to the right beyond the position shown in Figure 6 is absorbed by the engagement of the head 44 against the bottom of the bore 46. Therefore, the only way that the plunger rod 38 can move to the right beyond the position shown in Figure 6 is to move the piston head 36 which movement is normally prevented by the pressure liquid within the chamber 39.

During the landing, the end of the probe 23 enters the landing bell and cams the inner ends 28 of the locking links 26 to the right. This rotates the locking links 26 and compresses the spring 47. However, once the inner end of the probe is in the vertex 25 of the landing bell 16 and clear of the inner ends 28, the spring 47 returns the locking link 26 to the locked position shown. At this time the probe 22 is locked in the landing bell 16 and the pilot if he so desires can shut off the aircraft engine. As the thrust of the engine decreases to the point where it cannot support the aircraft, the end of the probe 23 tends to move out of the landing bell and causes engagement between the radial surface 24 and the inner ends 28 of the locking links. During this time the chamber 39 is pressurized and a secure connection is provided between the aircraft and the landing bell. When the aircraft is on the deck it is merely necessary to release the liquid pressure in the chamber 39 and the ends 28 of the lock links 26 are free to rotate and release the probe 22.

In order to absorb the impact shock when the probe 22 engages the vertex 25 of the bell 16, a shock absorbing mechanism is provided. This shock absorber includes a bore 51 formed in the landing bell adapted to receive a hollow piston 52 which is journaled on the boom 14. The hollow piston has a bore 53 which, in cooperation with the bore 51, forms a spring and shock absorbing cavity the volume of which is reduced by movement of the landing bell toward the hollow cylinder 52. This cavity is divided into an air chamber 54 separated from a liquid chamber 56 by a floating piston 57. The air chamber 54 is charged with air under pressure and the liquid chamber 56 is filled with liquid pressurized by the air in the chamber 54. To provide damping, the portion of the liquid chamber within the hollow piston 52 is connected to the portion thereof within the bore 51 by a restricting orifice 58. The air in the chamber 54 pressurizes the liquid in the chamber 56 and produces a resilient force urging the landing bell 16 to the left relative to the hollow piston 52 as shown in Figure 5 until a stop nut 59 mounted on the hollow piston 52 engages a gland member 61 positioned in the mouth of the bore 51. When the probe 22 engages the vertex 25, destructive impacts would occur if it were not for the shock absorbing mechanism just described. When the end of the probe 23 engages the vertex 25 it causes the landing bell to move toward the hollow piston 52 which pressurized the liquid within the chamber 56 and causes it to flow through the orifice 58 and compress the air in the chamber 54. The flow of the liquid through the orifice 58 resists this movement and thus absorbs the impact energy.

To produce rotation of the dolly support 17 relative to the boom 14 a motor 62 is mounted on the boom 14 and drives a gear 63 mounted on the dolly support 17 through a gear 64 and a gear box 66. Rotation of the landing bell 16 is provided by a second motor 67 which drives a gear 68 formed on the landing bell 16. A motor 69 mounted on the ship 10 is used to rotate the support frame 12 through a worm gear drive shown at 71. Since separate drives are used to control the various elements it is a simple matter to control each one individually.

Figure 7:
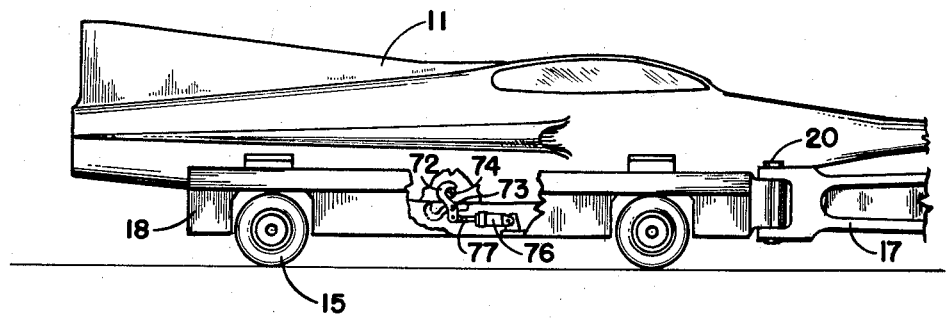

During the take-off cycle of operation, the aircraft 11 must be secured to the dolly 18 so that it will not slide off the dolly as both are lowered to the vertical position. A hook 72, shown in Figure 7, is therefore pivotally mounted on the dolly at 73 and adapted to engage the rearward side of a lug 74 formed on the aircraft. This hook 72 is rotatable between the full line position shown in Figure 7 and the phantom-line position by a hydraulic actuator having a cylinder 76 and a co-operating piston 77 which can be operated from a suitable source of hydraulic fluid under pressure. Before the aircraft 11 and dolly 18 are lowered to the vertical position, the hook 72 is extended and in engagement with the lug 74 formed on the aircraft so that the aircraft cannot slide back off the dolly. However, when the take-off is accomplished this structure permits the aircraft to freely move upward and away from the hook 72. During the landing phase, the hook is retracted since the weight of the aircraft is supported by the landing bell 16.

Those skilled in the art will recognize that the above described method and apparatus for handling VTO aircraft utilizes a mode of operation which is simpler than those previously used and simplifies the equipment necessary to produce the operation.

Although the preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description is determinative of the scope of the invention.

I claim:

1. An aircraft having a probe on the nose thereof, in combination with a landing platform, said platform comprising a supporting frame mounted adjacent said platform and rotatable around a vertical axis, a landing member adapted to be engaged by the probe on the nose of the aircraft, means on said landing member normally adapted to connect with said probe and retain it in engagement with said landing member and operable to release the probe, shock absorbing means connecting said landing member to said supporting frame on one side of said vertical axis operating to cushion movement between said member and supporting frame, and means connected to said supporting frame rotating said supporting frame around said vertical axis positioning said aircraft on said landing platform.

2. An aircraft having a probe on the nose thereof, in combination with a landing device, said landing device comprising a supporting frame mounted for rotation about a vertical axis, a landing bell normally supported by said frame formed with a conical inner surface terminating at a vertex, means within said bell adapted to receive the probe of the aircraft and prevent movement of the probe out of said vertex and operable to release the probe, a dolly carried by said frame movable relative to said bell adapted to engage the aircraft when the probe thereof is secured in said bell, and means connected to said dolly operating to move it when engaged by said aircraft from a first to a second position.

3. An aircraft having a probe on the nose thereof, in combination with a landing device, said landing device comprising a supporting frame mounted for rotation about a vertical axis, a landing bell normally supported by said frame formed with a conical inner surface terminating at a vertex adapted to receive the probe of the aircraft, cam means within said bell adapted to cam the end of said probe into said vertex, lock means on said bell normally adapted to engage and prevent movement of the probe out of said vertex and operable to release the probe, a dolly carried by said frame movable relative to said bell adapted to support the aircraft when the probe thereof is secured in said bell, and means connected to said dolly operating to move it when supporting the aircraft from a substantially vertical to a substantially horizontal position.

4. An aircraft having a probe on the nose thereof, in combination with a landing platform, said platform comprising a supporting frame mounted adjacent said platform for rotation around a vertical axis, a dolly support journaled on said supporting frame for rotation around a horizontal axis, an aircraft support dolly releasably connected to said dolly support, landing means journaled on said supporting frame for rotation around said horizontal axis adapted to engage the nose of the aircraft, means within said landing means adapted to automatically grip and support said aircraft upon upward movement thereof into engagement with said landing means, said landing means including a shock absorber cushioning the impact of engagement by the aircraft, first power means operably connected to said dolly support rotating the dolly about said horizontal axis into engagement with the aircraft supported by said landing means and thereafter moving said dolly and aircraft to a horizontal position, and second power means rotating said supporting frame until said dolly and aircraft are positioned on and supported by said platform.

5. An aircraft having a probe on the nose thereof, in combination with a landing platform, said platform comprising a supporting frame mounted adjacent said platform and rotatable around a vertical axis, a dolly support journaled on said supporting frame for rotation around a horizontal axis, an aircraft support dolly releasably connected to said dolly support, landing means journaled on said supporting frame for rotation around said horizontal axis adapted to be engaged by the nose of the aircraft, means within said landing means adapted to automatically grip and support said aircraft upon upward movement thereof into engagement with said landing means, said landing means including a shock absorber cushioning the impact of engagement by the aircraft, first power means operably connected to said dolly support rotating the dolly about its horizontal axis into engagement with the aircraft supported by said landing means and thereafter rotating said dolly and aircraft to a horizontal position level with said landing platform, and second power means rotating said supporting frame until said dolly and aircraft are positioned on and supported by said platform.

6. A landing and launching mechanism for VTO aircraft comprising a supporting frame, a landing member mounted on said supporting frame for rotation around a horizontal axis, first power means connected to said landing member operable to rotate it around said horizontal axis, a landing dolly mounted on said supporting frame for rotation around said horizontal axis, and second power means connected to said dolly operable to rotate it around said horizontal axis.

References Cited in the file of this patent

UNITED STATES PATENTS

| 1,448,088 | Scott | Mar. 13, 1923 |
| 1,504,403 | Warren | Aug. 12, 1924 |
| 1,622,140 | Getchell | Mar. 22, 1927 |
| 1,770,675 | Short | July 15, 1930 |
| 1,802,025 | Krell | Apr. 21, 1931 |
| 2,729,406 | Bush | Jan. 3, 1956 |